United States Patent
Matsubara

(10) Patent No.: US 12,210,238 B2
(45) Date of Patent: Jan. 28, 2025

(54) LIGHT CONTROL SHEET AND LIGHT CONTROL DEVICE

(71) Applicant: TOPPAN Inc., Tokyo (JP)

(72) Inventor: Yoshitaka Matsubara, Taito-ku (JP)

(73) Assignee: TOPPAN Inc., Tokyo (JP)

( * ) Notice: Subject to any disclaimer, the term of this patent is extended or adjusted under 35 U.S.C. 154(b) by 0 days.

(21) Appl. No.: 18/430,877

(22) Filed: Feb. 2, 2024

(65) Prior Publication Data

US 2024/0176180 A1 May 30, 2024

Related U.S. Application Data

(63) Continuation of application No. PCT/JP2022/029591, filed on Aug. 2, 2022.

(30) Foreign Application Priority Data

Aug. 2, 2021 (JP) .................................. 2021-126443

(51) Int. Cl.
*G02F 1/1335* (2006.01)
*G02B 5/22* (2006.01)
(Continued)

(52) U.S. Cl.
CPC ......... *G02F 1/133512* (2013.01); *G02B 5/22* (2013.01); *G02F 1/13398* (2021.01);
(Continued)

(58) Field of Classification Search
None
See application file for complete search history.

(56) References Cited

U.S. PATENT DOCUMENTS

| 2020/0292858 A1* | 9/2020 | Shouhi | G02F 1/1335 |
| 2022/0382102 A1* | 12/2022 | Zhong | C09K 19/601 |

(Continued)

FOREIGN PATENT DOCUMENTS

| JP | S60-191031 U | 12/1985 |
| JP | 2019-194654 A | 11/2019 |
| JP | 2020-016710 A | 1/2020 |

OTHER PUBLICATIONS

International Search Report issued Sep. 20, 2022 in PCT/JP2022/029591, filed Aug. 2, 2022, 5 pages.
(Continued)

*Primary Examiner* — Shan Liu
(74) *Attorney, Agent, or Firm* — Oblon, McClelland, Maier & Neustadt, L.L.P.

(57) ABSTRACT

A light control sheet includes: a laminate having a light control layer containing a liquid crystal compound and a dichroic dye; and a first protective layer and a second protective layer that are disposed to the laminate and absorb light in an absorption wavelength range including an ultraviolet region. The laminate in an opaque state has a chromaticity a* of −15 to 15 and a chromaticity b* of −16 to 15 in a CIE1976 (L*a*b*) color system in accordance with JIS-Z-8781-4. The smallest value of the absorption wavelength range is 360 nm or less, and the upper limit of the absorption wavelength range is 410 nm to 430 nm within the visible region. The protective layers have a chromaticity a* of −10 to 0 and a chromaticity b* of 0 to 15 in a CIE1976 (L*a*b*) color system in accordance with JIS-Z-8781-4.

19 Claims, 4 Drawing Sheets

(51) Int. Cl.
 *G02F 1/1339* (2006.01)
 *G02F 1/1343* (2006.01)
 *G02F 1/137* (2006.01)

(52) U.S. Cl.
 CPC .......... *G02F 1/13439* (2013.01); *G02F 1/137* (2013.01); *G02F 2201/50* (2013.01); *G02F 2202/04* (2013.01)

(56) References Cited

U.S. PATENT DOCUMENTS

2024/0009970 A1* 1/2024 Maillaud ........... B32B 17/10651
2024/0027818 A1* 1/2024 Wang .................... G02F 1/1334

OTHER PUBLICATIONS

Extended European Search Report issued Nov. 4, 2024 in corresponding European Patent Application No. 22853040.8, 9 pages.

* cited by examiner

FIG.5

| | | | EXAMPLE 1 | EXAMPLE 2 | EXAMPLE 3 | COMPARATIVE EXAMPLE 1 | COMPARATIVE EXAMPLE 2 | COMPARATIVE EXAMPLE 3 |
|---|---|---|---|---|---|---|---|---|
| DICHROIC DYE | | | BLACK-COLOR DICHROIC DYE | BLACK-COLOR DICHROIC DYE | BLACK-COLOR DICHROIC DYE | BLACK-COLOR DICHROIC DYE | DICHROIC DYE | BLUE-COLOR DICHROIC DYE |
| PROTECTIVE LAYER | | nm | 360~430 | 360~430 | 360~430 | 360~395 | 360~407 | 360~430 |
| | | a* | -7.8 | -7.8 | -7.8 | -2.0 | -4.0 | -7.8 |
| | | b* | 9.4 | 9.4 | 9.4 | 2.0 | 5.8 | 13.0 |
| LAMINATE (WITHOUT PROTECTIVE LAYER) | TOTAL LIGHT TRANSMITTANCE | % | 15.5 | 13.0 | 14.0 | 11.5 | 11.6 | 11.5 |
| | CHROMATICITY | a* | -4.4 | -0.2 | 4.8 | -0.6 | -0.6 | 17.7 |
| | | b* | -14.6 | 5.0 | -15.6 | 4.8 | 4.8 | -48.7 |
| LIGHT CONTROL SHEET (WITH PROTECTIVE LAYER) | TOTAL LIGHT TRANSMITTANCE | % | 15.0 | 12.0 | 13.0 | 11.5 | 11.6 | 12.0 |
| | CHROMATICITY | a* | -9.2 | -2.8 | 0.2 | -4.0 | -3.8 | 7.3 |
| | | b* | -9.9 | 9.5 | -9.7 | -1.5 | -1.2 | -41.8 |
| COLOR DETERMINATION | | | ○ | ○ | ○ | ○ | ○ | × |
| LIGHT RESISTANCE EVALUATION | | | ○ | ○ | ○ | × | △ | ○ |

LIGHT CONTROL SHEET AND LIGHT CONTROL DEVICE

CROSS-REFERENCE TO RELATED APPLICATIONS

The present application is a continuation of and claims the benefit of priority to International Application No. PCT/JP2022/029591, filed Aug. 2, 2022, which is based upon and claims the benefit of priority to Japanese Application No. 2021-126443, filed Aug. 2, 2021. The entire contents of these applications are incorporated herein by reference.

BACKGROUND OF THE INVENTION

Field of the Invention

The present invention relates to a light control sheet and a light control device.

Description of Background Art

A light control sheet includes transparent electrode layers and a light control layer sandwiched between the transparent electrode layers. A change in an orientation state of a liquid crystal compound contained in the light control layer changes the light transmittance of the light control sheet, following a change in a potential difference between the transparent electrode layers. The entire contents of this publication are incorporated herein by reference.

SUMMARY OF THE INVENTION

According to one aspect of the present invention, a light control sheet includes a laminate including a light control layer, a pair of transparent electrode layers sandwiching the light control layer, and a pair of transparent support layers sandwiching the transparent electrode layers, and a protective layer positioned on a surface of one of the transparent support layers of the laminate such that the protective layer absorbs light in an absorption wavelength range including an ultraviolet region. The light control layer in the laminate includes a liquid crystal compound and a dichroic dye such that orientations of the liquid crystal compound and the dichroic dye change in response to a change in a potential difference between the transparent electrode layers and that a transparent state is reversibly changed to an opaque state, the laminate in the opaque state has a chromaticity a* in a range of −15 to 15 and a chromaticity b* in a range of −16 to 15 in a CIE1976 (L*a*b*) color system in accordance with JIS-Z-8781-4, the absorption wavelength range of the protective layer has a smallest value of 360 nm or less, a largest value in a range of 410 nm to 430 nm within a visible region, and the protective layer has a chromaticity a* in a range of −10 to 0 and a chromaticity b* in a range of 0 to 15 in a CIE1976 (L*a*b*) color system in accordance with JIS-Z-8781-4.

According to another aspect of the present invention, a light control device includes a laminate including a light control layer, a pair of transparent electrode layers sandwiching the light control layer, and a pair of transparent support layers sandwiching the transparent electrode layers, a drive unit including circuitry that causes a potential difference between the pair of the transparent electrode layers and control the laminate between a transparent state and an opaque state, and a protective layer positioned on a surface of one of the transparent support layers of the laminate such that the protective layer absorbs light in an absorption wavelength range including an ultraviolet region. The light control layer in the laminate includes a liquid crystal compound and a dichroic dye such that orientations of the liquid crystal compound and the dichroic dye change in response to a change in the potential difference between the transparent electrode layers, the laminate in the opaque state has a chromaticity a* in a range of −15 to 15 and a chromaticity b* in a range of −16 to 15 in a CIE1976 (L*a*b*) color system in accordance with JIS-Z-8781-4, the absorption wavelength range of the protective layer has a smallest value of 360 nm or less, a largest value in a range of 410 nm to 430 nm within a visible region, and the protective layer has a chromaticity a* in a range of −10 to 0 and a chromaticity b* in a range of 0 to 15 in a CIE1976 (L*a*b*) color system in accordance with JIS-Z-8781-4.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a table illustrating evaluation results of Examples and Comparative Examples of a light control sheet.

DETAILED DESCRIPTION OF THE EMBODIMENTS

Figure 1:
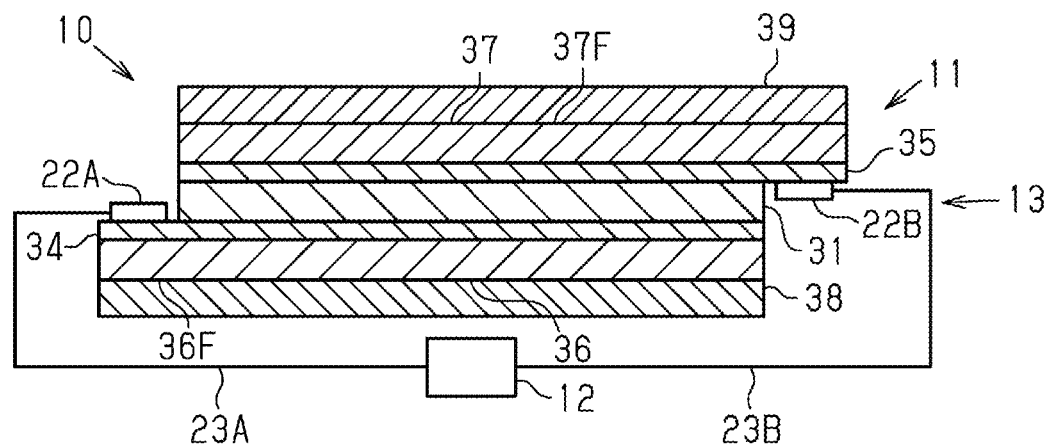
FIG. 1 is a configuration diagram illustrating a light control device of a normal type.

Embodiments will now be described with reference to the accompanying drawings, wherein like reference numerals designate corresponding or identical elements throughout the various drawings.

A light control sheet and a light control device according to embodiments of the present invention will be described.

A light control sheet is attached to a transparent substrate. The transparent substrate is a glass substrate or a resin substrate. Examples of the transparent substrate include a window glass mounted on a movable body such as a vehicle or an aircraft, a window glass installed on a building, and a partition disposed in a car or indoors. A surface attached with the light control sheet is planar or curved. The light control sheet may be sandwiched between two transparent substrates.

The drive form of the light control sheet is a normal type or a reverse type. The light control sheet of a normal type changes from an opaque state to a transparent state in response to voltage application and returns from a transparent state to an opaque state in response to release of the voltage application. The light control sheet of a reverse type changes from a transparent state to an opaque state in response to voltage application and returns from an opaque state to a transparent state in response to release of the voltage application.

It is noted that a normal type and a reverse type have in common that they include two transparent electrode layers and a light control layer. Hereinafter, a configuration and an operation of a normal type will be described, and thereafter a normal type and a reverse type will be described.

Structure of Light Control Device

With reference to FIG. 1, a schematic structure of a light control device 10 and a light control sheet 11 will be described. The light control device 10 has the light control sheet 11 and a driving unit 12. The light control sheet 11 has a light control layer 31, a first transparent electrode layer 34, a second transparent electrode layer 35, a first transparent support layer 36, a second transparent support layer 37, a first protective layer 38, and a second protective layer 39.

The light control layer 31 is disposed between the first transparent electrode layer 34 and the second transparent electrode layer 35. The first transparent electrode layer 34 is connected to the driving unit 12 via a first connection terminal 22A and a first wiring 23A. The first transparent electrode layer 34 is positioned between the first transparent support layer 36 and the light control layer 31 and is in contact with the first transparent support layer 36 and the light control layer 31. The light control layer 31 may be polymer dispersed liquid crystals (PDLC), polymer network liquid crystals (PNLC), and nematic curvilinear aligned phase (NCAP) liquid crystals. In the light control layer 31 that contains polymer dispersed liquid crystals, independent multiple voids or voids having a shape in which parts of independent shapes are joined are included in a resin layer, and a liquid crystal composition is retained in the voids. Polymer network liquid crystals include a three-dimensional mesh-like polymer network and retain liquid crystal molecules as oriented particles in voids of the polymer network. A nematic curvilinear aligned phase layer retains an encapsulated liquid crystal composition in a resin layer. The light control layer 31 of the present embodiment contains polymer dispersed liquid crystals.

The second transparent electrode layer 35 is positioned between the second transparent support layer 37 and the light control layer 31 and is in contact with the second transparent support layer 37 and the light control layer 31. A laminate 13 is constituted by the light control layer 31, the first transparent electrode layer 34, the second transparent electrode layer 35, the first transparent support layer 36, and the second transparent support layer 37.

To the laminate 13, the first protective layer 38 and the second protective layer 39 are laminated. The first protective layer 38 is disposed to the first transparent support layer 36 on a surface 36F which faces away from the surface in contact with the first transparent electrode layer 34. That is, the first protective layer 38 is disposed to the first transparent support layer 36 on the surface 36F which is opposite to the surface in contact with the first transparent electrode layer 34. The first protective layer 38 is in contact with the whole area or substantially the whole area of the surface 36F. The second protective layer 39 is in contact with the second transparent support layer 37 on the whole area or substantially the whole area of a surface 37F which faces away from the surface in contact with the second transparent electrode layer 35. That is, the second protective layer 39 is disposed to the second transparent support layer 37 on the surface 37F which is opposite to the surface in contact with the second transparent electrode layer 35. It is noted that an adhesive layer may lie between the first protective layer 38 and the first transparent support layer 36. Further, an adhesive layer may lie between the second protective layer 39 and the second transparent support layer 37.

Figure 2:
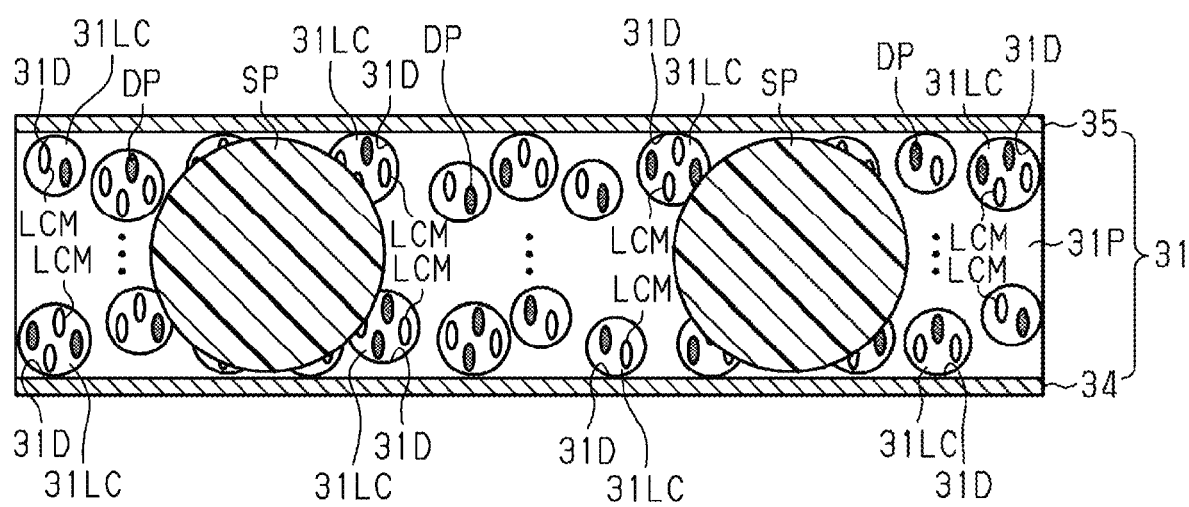
FIG. 2 is a configuration diagram illustrating a partial cross-sectional structure of a light control sheet of a normal type.

Next, elements constituting the light control sheet 11 will be described in detail with reference to FIG. 2. FIG. 2 illustrates a part of the light control sheet 11 which includes the light control layer 31 of a PDLC type, the first transparent electrode layer 34, and the second transparent electrode layer 35.

Light Control Layer

The light control layer 31 contains an organic polymer layer 31P, a liquid crystal composition 31LC, and a spacer SP. The organic polymer layer 31P is a cured body of a photopolymerizable compound. The photopolymerizable compound may be an ultraviolet-curable compound or an electron-beam-curable compound. The photopolymerizable compound has compatibility with the liquid crystal composition 31LC.

The organic polymer layer 31P sections voids 31D in the light control layer 31. When it is necessary to enhance the controllability of the dimension in the voids 31D, the photopolymerizable compound is preferably an ultraviolet-curable compound. An example of the ultraviolet-curable compound contains a polymerizable unsaturated bond at a terminal of the molecular structure. Alternatively, the ultraviolet-curable compound may contain a polymerizable unsaturated bond other than at a terminal of the molecular structure. The photopolymerizable compound is one polymerizable compound or a combination of two or more polymerizable compounds. The ultraviolet-curable compound is at least one selected from an acrylate compound, a methacrylate compound, a styrene compound, a thiol compound, and an oligomer of each compound. The acrylate compound may include a diacrylate compound, a triacrylate compound, and a tetraacrylate compound. An example of the acrylate compound is butyl ethyl acrylate, ethyl hexyl acrylate, or cyclohexyl acrylate. An example of the methacrylate compound is a dimethacrylate compound, a trimethacrylate compound, or a tetramethacrylate compound. An example of the methacrylate compound is N,N-dimethylaminoethyl methacrylate, phenoxyethyl methacrylate, methoxyethyl methacrylate, and tetrahydrofurfuryl methacrylate. An example of the thiol compound is 1,3-propanedithiol or 1,6-hexanedithiol. An example of the styrene compound is styrene and methylstyrene.

The lower limit value of the content ratio of the organic polymer layer 31P to the total amount of the organic polymer layer 31P and the liquid crystal composition 31LC is 20% by mass, and the lower limit value of the content ratio is more preferably 30% by mass. The upper limit value of the content ratio of the organic polymer layer 31P to the total amount of the organic polymer layer 31P and the liquid crystal composition 31LC is 70% by mass, and the upper limit value of the content ratio is more preferably 60% by mass.

The lower limit value and the upper limit value of the content ratio of the organic polymer layer 31P are determined depending on a range that allows crystal particles including the liquid crystal composition 31LC to be phase-separated from a cured body of the photopolymerizable compound in the curing process of the photopolymerizable compound. When it is necessary to enhance the mechanical strength of the organic polymer layer 31P, the lower limit value of the content ratio of the organic polymer layer 31P is preferably high. When it is necessary to lower the drive voltage of a liquid crystal compound LCM, the upper limit value of the content ratio of the organic polymer layer 31P is preferably low.

The liquid crystal composition 31LC contains the liquid crystal compound LCM and a dichroic dye DP. It is noted that the liquid crystal composition 31LC may further contain a viscosity reducer, a defoamer, an antioxidant, a weathering agent, and a solvent. An example of the weathering agent is an ultraviolet absorbent or a photostabilizer.

The type of retention of the liquid crystal composition 31LC by the organic polymer layer 31P is any one of a polymer dispersed type, a polymer network type, and a capsule type. Alternatively, the type of retention of the liquid crystal composition 31LC by the organic polymer layer 31P may be a form of combining two or more of these groups.

The organic polymer layer 31P in the light control layer 31 of a polymer dispersed type sections multiple voids 31D isolated from each other. The organic polymer layer 31P in the light control layer 31 of a polymer network type has three-dimensional mesh-like voids 31D. The liquid crystal composition 31LC is disposed in the mutually communicating mesh-like voids 31D. The organic polymer layer 31P in the light control layer 31 of a capsule type has dispersed capsule-like voids 31D. The voids 31D have two or more sizes, and the shape of the voids 31D is spherical, ellipsoidal, or indefinite.

The liquid crystal compound LCM has positive dielectric anisotropy in which the dielectric constant in the major axis direction may be larger than the dielectric constant in the minor axis direction. Alternatively, the liquid crystal compound LCM has negative dielectric anisotropy in which the dielectric constant in the major axis direction may be lower than the dielectric constant in the minor axis direction. The dielectric anisotropy of the liquid crystal compound LCM is appropriately selected based on the presence or absence of each orientation layer in the light control sheet 11 and the drive form.

The liquid crystal compound LCM is at least one selected from those based on Schiff base, azo, azoxy, biphenyl, terphenyl, benzoic acid ester, tolan, pyrimidine, pyridazine, cyclohexanecarboxylic acid ester, phenylcyclohexane, biphenyl cyclohexane, dicyanobenzene, naphthalene, and dioxane. The non-polymerizable liquid crystal compound is one liquid crystal compound or a combination of two or more liquid crystal compounds.

The dichroic dye DP has an elongated molecular shape, and the absorbance of the visible region in the molecular major axis direction is larger than the absorbance in the molecular minor axis direction. The dichroic dye DP in the present embodiment exhibits a black color or a color close to a black color in a state in which the molecular major axis direction intersects with the light incident direction at prescribed angles. In brief, the dichroic dye DP exhibits a black color or a color close to a black color when the molecular major axis direction is oriented so as to intersect at substantially right angles with the normal direction to the contact surface with the first transparent electrode layer 34 of the light control layer 31 and to the contact surface with the second transparent electrode layer 35. The dichroic dye DP exhibits a color when driven by a guest-host form with the liquid crystal compound LCM as a host.

Further, the dichroic dye DP to be used is a dye that allows the light control layer 31 in an opaque state to have a chromaticity a* of −15 or more and 15 or less and a chromaticity b* of −16 or more and 15 or less in the CIE1976 (L*a*b*) color system. Chromaticity a* and chromaticity b* in the CIE1976 (L*a*b*) color system are identified in accordance to a method for calculating the color coordinate of the CIE1976 (L*a*b*) color space defined in JIS-Z-8781-4 (ISO 11664-4).

The dichroic dye DP is at least one selected from a polyiodide, an azo compound, an anthraquinone compound, a naphthoquinone compound, an azomethine compound, a tetrazine compound, a quinophthalone compound, a merocyanine compound, a perylene compound, and a dioxazine compound. The dichroic dye DP is one dye or a combination of two or more dyes. When it is necessary to enhance the light resistance and to increase the dichroic ratio, the dichroic dye is at least one selected from an azo compound and an anthraquinone compound and more preferably an anthraquinone compound. A black-color dichroic dye is a combination of a cyan-based dichroic dye, a magenta-based dichroic dye, and a yellow-based dichroic dye. A blue-color dichroic dye contains a cyan-based dichroic dye.

The content ratio of the dichroic dye DP to the total solid content of the light control layer 31 is 10% by weight or less. That is, the content ratio of the dichroic dye DP to the weight of the organic polymer layer 31P constituting the light control layer 31 is 10% by weight or less. Further, when the content ratio of the dichroic dye DP is 5% by weight or less, a light control sheet 11 having an excellent appearance can be obtained.

The spacer SP is dispersed throughout the entirety of the organic polymer layer 31P. The spacer SP sets the thickness of the light control layer 31 around the spacer SP and makes the thickness of the light control layer 31 uniform. The spacer SP may be a bead spacer or a photo spacer formed through exposure and development of a photoresist. The spacer SP has optical translucency and may be colorless and transparent, or colored and transparent. A color exhibited by the colored transparent spacer SP is preferably the same color as a color exhibited by the dichroic dye DP.

Transparent Electrode Layer

The first transparent electrode layer 34 and the second transparent electrode layer 35 are each colorless and transparent. A material constituting each of the first transparent electrode layer 34 and the second transparent electrode layer 35 is a conductive inorganic oxide, metal, or a conductive organic polymer compound. An example of the conductive inorganic oxide is any one selected from indium tin oxide, fluorine-doped tin oxide, tin oxide, and zinc oxide. The metal is a nanowire of gold or silver. An example of the conductive organic polymer compound is any one of carbon nanotubes and poly(3,4-ethylenedioxythiophene).

Transparent Support Layer

A material constituting each of the first transparent support layer 36 and the second transparent support layer 37 is an organic polymer compound or an inorganic polymer compound. An example of the organic polymer compound is at least one selected from polyester, polyacrylate, polycarbonate, and polyolefin. An example of the inorganic polymer compound is at least one selected from silicon oxide, silicon oxynitride, and silicon nitride. The first transparent support layer 36 and the second transparent support layer 37 are each preferably colorless transparent. The first transparent support layer 36 may be a single-layer structure or a multi-layer structure. The second transparent support layer 37 may be a single-layer structure or a multi-layer structure.

Protective Layer

The first protective layer 38 and the second protective layer 39 are colored transparent. The first protective layer 38 and the second protective layer 39 suppress entry of light having a specific wavelength including the ultraviolet region into the light control layer 31 and suppress color fading of the dichroic dye DP contained in the light control layer 31.

The absorption wavelength region of the first protective layer 38 and the second protective layer 39 contains a part of the ultraviolet region of less than 400 nm and a part of the visible light region of 400 nm or more. The first protective layer 38 and the second protective layer 39 have the maximum value of the absorbance in the wavelength range of 360 nm or more and 430 nm or less. Further, the smallest value of the absorption wavelength range of the first protective layer 38 and the second protective layer 39 is 360 nm or less. The smallest value of the absorption wavelength range is the lower limit value of the absorption wavelength in the absorption wavelength range. The largest value of the absorption wavelength range of the first protective layer 38 and the second protective layer 39 is 410 nm or more and 430 nm or less within the visible region. That is, a wavelength that gives the maximum value to the absorbance of the first protective layer 38 and the second protective layer 39 is 360 nm or more and 430 nm or less. The largest value of the absorption wavelength range is the upper limit value of the absorption wavelength in the absorption wavelength range. The edge at the low wavelength side in a wavelength range in which absorbance is observed in the first protective layer 38 and the second protective layer 39 is 360 nm or less. The edge at the long wavelength side in a wavelength range in which absorbance is observed in the first protective layer 38 and the second protective layer 39 is 410 nm or more and 430 nm or less.

The first protective layer 38 and the second protective layer 39 contain an organic polymer compound or an inorganic compound and a light-absorbing material. The light-absorbing material preferably has transparency. An example of the light-absorbing material is at least one selected from those based on cyanoacrylate, triazine, benzophenone, benzotriazole, and triazine. As the first protective layer 38 and the second protective layer 39, a publicly known short wavelength cut filter (long pass filter) may be used.

The first protective layer 38 and the second protective layer 39 may be a single-layer structure or may be a multi-layer structure formed by overlapping multiple layers of layers including an organic polymer compound and layers including an inorganic compound.

The thickness of each of the first protective layer 38 and the second protective layer 39 is preferably 10 μm or more and 2.5 mm or less. It is noted that when the first protective layer 38 and the second protective layer 39 are a multi-layer structure in which a light-absorbing layer is disposed between support layers that do not contain a light-absorbing material, this light-absorbing layer has a thickness of 23 mm or less.

Further, the first protective layer 38 and the second protective layer 39 may exhibit a color by mixing a dye to a base material such as an organic polymer compound or an inorganic compound or may exhibit a color by printing on a transparent substrate with a colored ink.

It is noted that if the light control sheet 11 switches between a transparent state and an opaque state based on a change in the orientation state of the liquid crystal compound LCM, the light control sheet 11 may include one or more additional functional layers. The additional functional layers may be a gas barrier layer which suppresses transmission of oxygen and moisture toward the light control layer 31 or an ultraviolet barrier layer which suppresses transmission of ultraviolet light at other than a specific wavelength toward the light control layer 31. The additional functional layers may be a hardcoat layer which mechanically protects each layer of the light control sheet 11 or an adhesive layer which enhances the adhesion between layers in the light control sheet 11.

The driving unit 12 is connected with the first transparent electrode layer 34 and the second transparent electrode layer 35. The driving unit 12 applies a drive voltage to the first transparent electrode layer 34 and the second transparent electrode layer 35 to change the orientations of the liquid crystal compound LCM and the dichroic dye DP corresponding to a change in a potential difference between the first transparent electrode layer 34 and the second transparent electrode layer 35. The drive voltage is a voltage for changing the orientation states of the liquid crystal compound LCM and the dichroic dye DP. The driving unit 12 changes the orientation states of the liquid crystal compound LCM and the dichroic dye DP to switch the light control sheet 11 from one to the other of a transparent state and an opaque state. In an opaque state, the light control sheet 11 exhibits a black color or a color close to a black color, and the total light transmittance is lower than in a transparent state. In other words, in the light control sheet 11 in an opaque state, the haze as a turbidity value is higher than that in a transparent state.

While application with a drive voltage is released, the major axis directions of the liquid crystal compound LCM and the dichroic dye DP are disordered. This causes scattering over the whole of the visible light region in the light control layer 31, and the light control sheet 11 becomes in an opaque state. Further, the major axis direction of the dichroic dye DP also becomes in disorder. Of the dichroic dyes DP, the dichroic dye DP, in which an angle formed between the major axis direction and a normal line to a contact surface with the first transparent electrode layer 34 in the light control layer 31 is a prescribed angle closer to 90°, exhibits a black color. Of the dichroic dyes DP, the dichroic dye DP, in which an angle formed between the major axis direction and a normal line to a contact surface with the second transparent electrode layer 35 in the light control layer 31 is a prescribed angle closer to 90°, exhibits a black color. It is noted that the above-described normal line direction is equivalent to the thickness direction of the light control layer 31.

In response to application of a drive voltage, the liquid crystal compound LCM is subjected to an orientation regulation force by an electric field, and the major axis directions of the liquid crystal compound LCM and the dichroic dye DP are accordingly aligned along an electric field direction. This causes the total light transmittance of the light control sheet 11 to become higher than that in an opaque state. Further, the major axis direction of the dichroic dye DP is also aligned along an electric field direction, and thus the color of the light control sheet 11 becomes colorless or in a state closer to colorless.

In response to a drive voltage being released again, the orientation regulation force exerted by an electric field to the liquid crystal compound LCM and the dichroic dye DP is released, and accordingly the major axis directions of the liquid crystal compound LCM and the dichroic dye DP become disordered. This causes scattering over the whole of the visible light region in the light control layer 31, and the light control sheet 11 becomes in an opaque state again.

Figure 3:
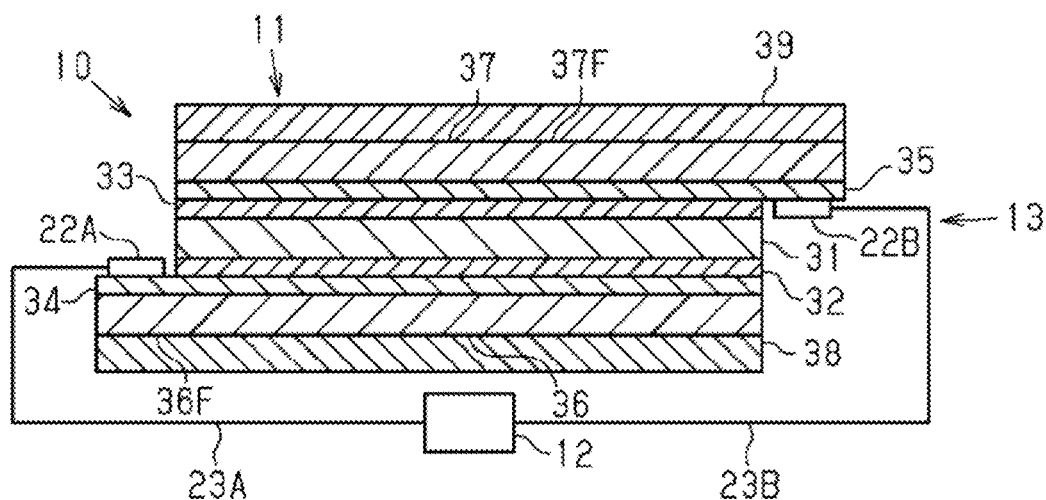
FIG. 3 is a configuration diagram illustrating a light control device of a reverse type.

Next, with reference to FIG. 3, the light control sheet 11 of a reverse type will be described. FIG. 3 is a view of the light control sheet 11 of a reverse type. The light control sheet 11 of a reverse type includes a first orientation layer 32 and a second orientation layer 33. A light control layer 31 is disposed between the first orientation layer 32 and the second orientation layer 33. The first orientation layer 32 and the second orientation layer 33, between which the light control layer 31 is sandwiched, are positioned between the first transparent support layer 36 and the second transparent support layer 37.

While application with a drive voltage to the first transparent electrode layer 34 and the second transparent electrode layer 35 is released, the liquid crystal compound LCM is subjected to an orientation regulation force from the first orientation layer 32 and the second orientation layer 33, and the major axis direction of the liquid crystal compound LCM is aligned along the thickness direction of the light control layer 31. This suppresses scattering over the whole of the visible light region in the light control layer 31, and the light control sheet 11 becomes in a transparent state.

In response to the start of application with a drive voltage, the liquid crystal compound LCM is subjected to an orientation regulation force by an electric field, and the major axis direction of the liquid crystal compound LCM starts moving toward a direction orthogonal to an electric field direction. At this time, the major axis direction of the liquid crystal compound LCM cannot sufficiently move under the restriction of an intermolecular interaction in the liquid crystal composition 31LC and the size of the voids 31D and becomes disordered. This causes scattering over the whole of the visible light region in the light control layer 31, and the light control sheet 11 becomes in an opaque state.

In response to application of a drive voltage being released again, the orientation regulation force exerted by an electric field on the liquid crystal compound LCM is released, and the major axis direction of the liquid crystal compound LCM is accordingly aligned along the thickness direction of the light control layer 31 following the orientation regulation force by the first orientation layer 32 and the second orientation layer 33. This suppresses scattering over the whole of the visible light region in the light control layer 31, and the light control sheet 11 becomes in a transparent state again.

Optical Characteristics of Light Control Sheet

Next, optical characteristics of the light control sheet 11 will be described.

The first protective layer 38 and the second protective layer 39 satisfy Conditions 1 and 2 below.

Condition 1: The smallest value of the absorption wavelength range is 360 nm or less, and the largest value of the absorption wavelength range is 410 nm or more and 430 nm or less within the visible region.

Condition 2: In the CIE1976 (L*a*b*) color system in accordance with JIS-Z-8781-4, chromaticity a* is −10 or more and 0 or less, and chromaticity b* is 0 or more and 15 or less.

Furthermore, the first protective layer 38 and the second protective layer 39 preferably satisfy Condition 3 below.

Condition 3: The total light transmittance is 70% or more.

Further, as described above, the laminate 13 satisfies Condition 4 below by containing the dichroic dye DP.

Condition 4: In the CIE1976 (L*a*b*) color system in accordance with JIS-Z-8781-4, chromaticity a* is −15 or more and 15 or less, and chromaticity b* is −16 or more and 15 or less.

When the laminate 13 satisfying Condition 4 as well as the first protective layer 38 and the second protective layer 39 satisfying Conditions 1 to 3 are used to constitute the light control sheet 11, the light control sheet 11 satisfies Characteristics 1 and 2 below.

Characteristic 1: The light control sheet 11 in an opaque state has a total light transmittance of 30% or less.

Characteristic 2: In the CIE1976 (L*a*b*) color system in accordance with JIS-Z-8781-4, chromaticity a* is −10 or more and 10 or less, and chromaticity b* is −10 or more and 10 or less.

Figure 4:
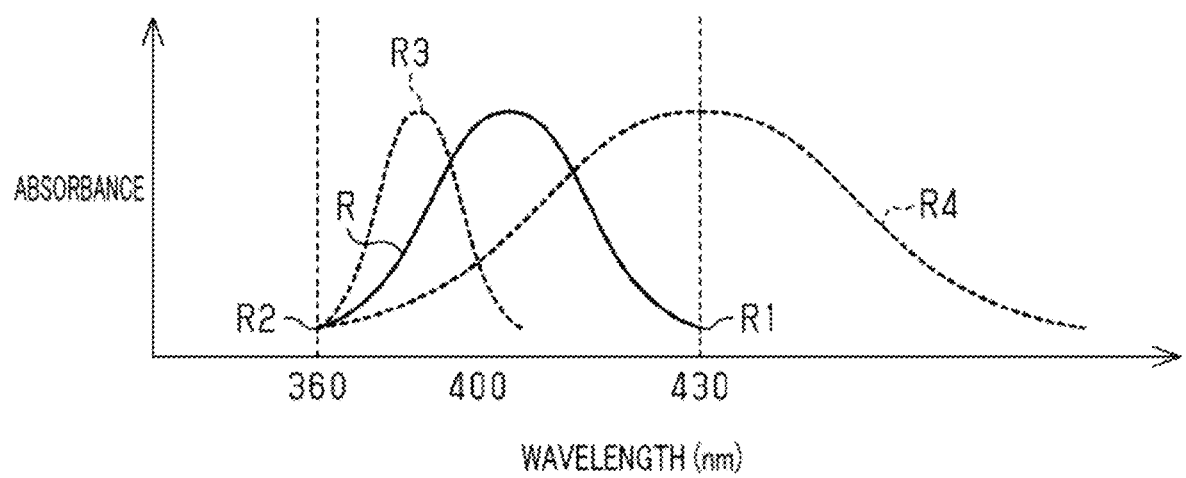
FIG. 4 is a graph illustrating optical characteristics of a protective layer.

With reference to FIG. 4, Conditions 1 and 2 described above will be described. FIG. 4 is a schematic diagram illustrating an example of the absorption wavelength range R of the first protective layer 38 and the second protective layer 39. In the absorption wavelength range R, the smallest value R2 is 360 nm or less, and the largest value R1 is 410 nm or more and 430 nm or less within the visible region. Since the smallest value R2 is 360 nm or less, light having a wavelength in a long-wavelength ultraviolet region can be absorbed. Since the dichroic dye DP is gradually decomposed by irradiation with ultraviolet light, color fading of the dichroic dye DP can be suppressed when the first protective layer 38 and the second protective layer 39 absorb a part of ultraviolet light. Further, since the dichroic dye DP is also decomposed by visible light having a relatively short wavelength in some cases, the effect of suppressing the color fading of the dichroic dye DP can be further enhanced when the largest value R1 is 410 nm or more and 430 nm or less.

When in FIG. 4, the largest value is around 400 nm between the ultraviolet region and the visible light region like an absorption spectrum R3 indicated by a broken line, the amount of absorbable visible light is small, and therefore the effect of suppressing the color fading of the dichroic dye DP cannot be enhanced. Further, when in FIG. 4, the largest value exceeds 430 nm like an absorption spectrum R4 indicated by a broken line, the effect of suppressing the color fading of the dichroic dye DP is enhanced, while the transparency of the light control sheet 11 in a transparent state is reduced.

The absorption spectrum of the first protective layer 38 and the second protective layer 39 may be a continuous spectrum having one peak or a continuous spectrum having multiple peaks. When the absorption spectrum is a continuous spectrum having multiple peaks, it is preferable that the end of each peak overlaps with another peak in the absorption wavelength range R. This enables the first protective layer 38 and the second protective layer 39 to absorb light in the whole region of the absorption wavelength range R and suppress color fading.

However, when the largest value R1 of the absorption wavelength range R is set to 410 nm or more and 430 nm or less, the first protective layer 38 and the second protective layer 39 absorb violet-to-blue light having a short wavelength within the visible region. Therefore, the first protective layer 38 and the second protective layer 39 appear to take on a yellow color when observed by the naked eye. When the first protective layer 38 and the second protective layer 39 take on a yellow color, the light control sheet 11 does not exhibit a black color having an excellent appearance. Therefore, for cancelling the yellow color, the first protective layer 38 and the second protective layer 39 themselves have a color in which chromaticity a* is −10 or more and 0 or less, and chromaticity b* is 0 or more and 15 or less, in the CIE1976 (L*a*b*) color system, which is defied in Condition 2.

Next, Condition 3 will be described. The first protective layer 38 and the second protective layer 39 preferably have a total light transmittance of 70% or more. The total light transmittance is a value obtained by a measurement method of total light transmittance using a D65 light source in accordance with JIS K 7361-1:1997 (ISO 1468-1). When the total light transmittance is 70% or more, high transparency is maintained when the light control sheet 11 is driven into a transparent state, even if the first protective layer 38 and the second protective layer 39 are colored. It is noted that since the first protective layer 38 and the second protective layer 39 are colored, the total light transmittance is 95% or less.

For Condition 4, the chromaticity of the laminate 13 can be adjusted by appropriately selecting one or more black-color dichroic dyes DP.

Next, Condition 5 will be described. In the light control sheet 11, the total light transmittance of the visible light in an opaque state is 30% or less. The total light transmittance is a value obtained by a measurement method of total light transmittance using a D65 light source in accordance with JIS K 7361-1:1997 (ISO 1468-1). When the total light transmittance in an opaque state is set to 30% or less, a haze that enables exertion of the effect of protecting privacy in an opaque state can be obtained.

Method of Producing Light Control Sheet

A method of producing the light control sheet 11 will be described. First, the first transparent support layer 36 provided with the first transparent electrode layer 34 and the second transparent support layer 37 provided with the second transparent electrode layer 35 are prepared. Next, a coat for forming the light control layer 31 is formed between the first transparent support layer 36 and the second transparent support layer 37. It is noted that a method of producing the light control sheet 11 of a reverse type includes forming a coat between the first transparent support layer 36 provided with the first transparent electrode layer 34 and the second transparent support layer 37 provided with the second transparent electrode layer 35.

The coat contains a photopolymerizable compound, the liquid crystal composition 31LC, and a polymerization initiator for initiating the polymerization of the dichroic dye DP and the photopolymerizable compound. The polymerization initiator is at least one selected from a diketone compound, an acetophenone compound, a benzoin compound, a benzophenone compound, and a thioxanthone compound. The polymerization initiator may be one compound or a combination of two or more compounds. An example of the polymerization initiator is at least one selected from benzoin methyl ether, benzoin ethyl ether, benzoin isopropyl ether, and cyclohexyl phenyl ketone.

The method of producing the light control sheet 11 includes polymerizing the photopolymerizable compound in the coat to phase-separate liquid crystal particles including the liquid crystal composition 31LC from the photopolymerizable compound. Light for polymerizing the photopolymerizable compound may be ultraviolet light or an electron beam. Light for polymerizing the photopolymerizable compound may be emitted toward the first transparent support layer 36, toward the second transparent support layer 37, or toward both the first transparent support layer 36 and the second transparent support layer 37.

Phase-separation of liquid crystal particles including the liquid crystal composition 31LC proceeds through the polymerization of the photopolymerizable compound and the diffusion of the liquid crystal composition 31LC. The polymerization rate of the photopolymerizable compound changes with the intensity of light emitted to the photopolymerizable compound. The diffusion rate of the liquid crystal composition 31LC changes with the treatment temperature during the polymerization of the photopolymerizable compound. In the phase separation of the liquid crystal composition 31LC, the intensity of light emitted to the photopolymerizable compound, the emission duration, and the treatment temperature during the polymerization of the photopolymerizable compound are set such that the size of liquid crystal particles is a desired size and such that the number of liquid crystal particles is a desired number. That is, in the phase separation of the liquid crystal composition 31LC, the intensity of light emitted to the photopolymerizable compound, the emitting time, and the treatment temperature during the polymerization of the photopolymerizable compound are set such that the size of the voids 31D is a desired size and such that the number of the voids 31D is a desired number. This constitutes the laminate 13 including the light control layer 31, the first transparent electrode layer 34, the second transparent electrode layer 35, the first transparent support layer 36, and the second transparent support layer 37.

Subsequently, the first protective layer 38 is joined to the first transparent support layer 36 on the surface 36F that faces away from a surface in contact with the first transparent electrode layer 34. Further, the second protective layer 39 is joined to the second transparent support layer 37 on the surface 37F that faces away from a surface in contact with the second transparent electrode layer 35. The first protective layer 38 and the second protective layer 39 may be joined to the first transparent support layer 36 and the second transparent support layer 37 respectively through an adhesive material or by another method such as welding.

According to the above-described embodiments, advantageous effects listed below can be achieved.

(1) In the laminate 13 having the light control layer 31 that contains the dichroic dye DP, chromaticity a* is −15 or more and 15 or less, and chromaticity b* is −16 or more and 15 or less, in the CIE1976 (L*a*b*) color system. The light control sheet 11 in an opaque state exhibits a black color or a color close to black. Further, the light control sheet 11 is configured such that the first protective layer 38 and the second protective layer 39, which absorb light in the absorption wavelength range including the ultraviolet region, are laminated on the laminate 13. This suppresses color fading of the dichroic dye DP which has a light resistance lower than that of the liquid crystal compound LCM or the like.

The largest value R1 of the absorption wavelength range R of the first protective layer 38 and the second protective layer 39 is 410 nm or more and 430 nm or less. This enhances the effect of suppressing the color fading of the dichroic dye DP while allowing the first protective layer 38 and the second protective layer 39 themselves to take on a yellow color. Here, the first protective layer 38 and the second protective layer 39 have a chromaticity a* of −10 or more and 0 or less and a chromaticity b* of 0 or more and 15 or less in the CIE1976 (L*a*b*) color system. This suppresses a yellow color exhibited by the first protective layer 38 and the second protective layer 39. Further, since the first protective layer 38 and the second protective layer 39 are laminated on the laminate 13, significant change in the color of the laminate 13 itself is suppressed.

(2) In the first protective layer 38 and the second protective layer 39, the total light transmittance in the visible region is 70% or more. This increases the transparency of the light control sheet 11 in a transparent state.

(3) The spacer SP exhibits the same color as a color exhibited by the laminate 13 in an opaque state. Therefore, the light control sheet 11 has an appearance in which the spacers SP are inconspicuous.

(4) Since the total light transmittance of the light control sheet 11 in an opaque state is 30% or less, the light control sheet 11 in an opaque state enhances privacy protection performance.

EXAMPLES

With reference to FIG. 5, Examples and Comparative Examples of the light control sheet 11 will be described below. Examples and Comparative Examples are the light control sheet 11 of a normal type in which the first orientation layer 32 and the second orientation layer 33 are omitted. It is noted that these Examples do not necessarily limit the present invention.

Example 1

The constituent material of each member constituting the light control sheet 11 of Example 1, the content of each constituent material, and the dimension of each member are illustrated below.

First transparent electrode layer 34 and second transparent electrode layer 35: indium tin oxide, thickness 30 nm First transparent support layer 36 and second transparent support layer 37: polyethylene terephthalate film, thickness 125 μm Spacer SP: truly spherical particles formed with PMMA, particle diameter 16 μm, black color First protective layer 38 and second protective layer 39: product name "TP402", manufactured by Tomoegawa Co., Ltd.

Further, the material of a coating liquid and its ratio are illustrated below. The ratio denotes a ratio to the solid component of a coating liquid.

Ultraviolet light polymerizable compound: isobornyl acrylate, pentaerythritol triacrylate, urethane acrylate, 41% by weight Polymerization initiator: 1-hydroxycyclohexyl phenyl ketone, 3% by weight Liquid crystal compound LCM: cyanobiphenyl compound, 54% by weight Dichroic dye DP: blue-color dichroic dye (product name M-412: manufactured by Mitsui Fine Chemicals, Inc.), 0.5% by weight, and black-color dichroic dye (product name YH-428: manufactured by Mitsui Fine Chemicals, Inc.), 1.5% by weight The coating liquid of Example 1 was used to form a coat having a thickness of 16 μm on the first transparent electrode layer 34, and the spacer SP was dispersed in the coat. Then, the coat in which the spacer SP was dispersed was laminated by the first transparent electrode layer 34 and the second transparent electrode layer 35, and ultraviolet light at 365 nm were emitted toward the first transparent support layer 36 to obtain the light control sheet 11 of Example 1. The intensity of the ultraviolet light was set to 10 mW/cm$^2$, and the emission duration of the ultraviolet light was set to 100 seconds.

Furthermore, the first protective layer 38 was joined to the first transparent electrode layer 34 via an adhesive material. In addition, the second protective layer 39 was joined to the second transparent electrode layer 35 via an adhesive material.

The optical characteristics of the laminate 13 of Example 1 are illustrated below. The total light transmittance is measured by a method in accordance with JIS K 7361-1: 1997 (ISO 1468-1). Chromaticity a* and chromaticity b* are identified in the CIE1976 (L*a*b*) color system in accordance with JIS-Z-8781-4.

Total light transmittance: 15.5%
Chromaticity a*: −4.4
Chromaticity b*: −14.6

The optical characteristics of the first protective layer 38 and the second protective layer 39 of Example 1 are illustrated below. In the absorption wavelength range of the first protective layer 38 and the second protective layer 39 of Example 1, the smallest value is 360 nm, and the largest value of the absorption wavelength range is 430 nm.

Absorption wavelength: 360 nm or more and 430 nm or less
Chromaticity a*: −7.8
Chromaticity b*: +9.4

Example 2

The light control sheet 11 of Example 2 was obtained under the same condition as that in Example 1, except that the dichroic dye DP of Example 1 was changed. That is, only a black-color dichroic dye (product name YH-428: manufactured by Mitsui Fine Chemicals, Inc.) was used as the dichroic dye DP. The content ratio of the black-color dichroic dye was 2.0% by weight which is the same as the content ratio of the dichroic dye DP of Example 1. A coating liquid of Example 2 was prepared at the same formulation ratio as that of the coating liquid of Example 1. Otherwise, the light control sheet 11 of Example 2 was obtained under the same condition as that in Example 1.

The optical characteristics of the laminate 13 of Example 2 are illustrated below.

Total light transmittance: 13.0%
Chromaticity a*: −0.2
Chromaticity b*: +5.0

The optical characteristics of the first protective layer 38 and the second protective layer 39 of Example 2 are illustrated below. In the absorption wavelength range of the first protective layer 38 and the second protective layer 39 of Example 2, the smallest value is 360 nm, and the largest value of the absorption wavelength range is 430 nm.

Absorption wavelength: 360 nm or more and 430 nm or less
Chromaticity a*: −7.8
Chromaticity b*: +9.4

Example 3

The light control sheet 11 of Example 3 was obtained under the same condition as that in Example 1, except that the dichroic dye DP of Example 1 was changed. That is, 1% by weight of a blue-color dichroic dye (product name M-412: manufactured by Mitsui Fine Chemicals, Inc.) and 1% by weight of a black-color dichroic dye (product name YH-428: manufactured by Mitsui Fine Chemicals, Inc.) were used as the dichroic dye DP to prepare a coating liquid of Example 3 at the same formulation ratio as that of the coating liquid of Example 1. Otherwise, the light control sheet 11 of Example 3 was obtained under the same condition as that in Example 1.

The optical characteristics of the laminate 13 of Example 3 are illustrated below.

Total light transmittance: 14.0%
Chromaticity a*: +4.8
Chromaticity b*: −15.6

The optical characteristics of the first protective layer 38 and the second protective layer 39 of Example 3 are illustrated below. In the absorption wavelength range of the first protective layer 38 and the second protective layer 39 of Example 3, the smallest value is 360 nm, and the largest value of the absorption wavelength range is 430 nm.

Absorption wavelength: 360 nm or more and 430 nm or less
Chromaticity a*: −7.8
Chromaticity b*: +9.4

Comparative Example 1

The light control sheet 11 of Comparative Example 1 was obtained under the same condition as that in Example 1, except that the dichroic dye DP, the first protective layer 38, and the second protective layer 39 of Example 1 were changed. That is, only 2% by weight of a black-color dichroic dye (product name YH-428: manufactured by Mitsui Fine Chemicals, Inc.) was used as the dichroic dye DP to prepare a coating liquid of Comparative Example 1 at the same formulation ratio as that of the coating liquid of Example 1. Then, the light control sheet 11 of Comparative Example 1 was obtained under the same condition as that in Example 1, except for the first protective layer 38 and the second protective layer 39.

The optical characteristics of the laminate 13 of Comparative Example 1 are illustrated below.

Total light transmittance: 11.5%
Chromaticity $a^*$: −0.6
Chromaticity $b^*$: +4.8

The optical characteristics of the first protective layer 38 and the second protective layer 39 of Comparative Example 1 are illustrated below. In the absorption wavelength range of the first protective layer 38 and the second protective layer 39 of Comparative Example 1, the smallest value is 360 nm, and the largest value of the absorption wavelength range is 395 nm.

Absorption wavelength: 360 nm or more and 395 nm or less
Chromaticity $a^*$: −2.0
Chromaticity $b^*$: +2.0

Comparative Example 2

The light control sheet 11 of Comparative Example 2 was obtained under the same conditions as that in Example 1, except that the dichroic dye DP, the first protective layer 38, and the second protective layer 39 of Example 1 were changed. That is, only 2% by weight of a black-color dichroic dye (product name YH-428: manufactured by Mitsui Fine Chemicals, Inc.) was used as the dichroic dye DP to prepare a coating liquid of Comparative Example 2 at the same formulation ratio as that of the coating liquid of Example 1. Then, the light control sheet 11 of Comparative Example 2 was obtained under the same conditions as that in Example 1, except for the first protective layer 38 and the second protective layer 39.

The optical characteristics of the laminate 13 of Comparative Example 2 are illustrated below.

Total light transmittance: 11.6%
Chromaticity $a^*$: −0.6
Chromaticity $b^*$: +4.8

The optical characteristics of the first protective layer 38 and the second protective layer 39 of Comparative Example 2 are illustrated below. In the absorption wavelength range of the first protective layer 38 and the second protective layer 39 of Comparative Example 2, the smallest value is 360 nm, and the largest value of the absorption wavelength range is 407 nm.

Absorption wavelength: 360 nm or more and 407 nm or less
Chromaticity $a^*$: −4.0
Chromaticity $b^*$: +5.8

Comparative Example 3

The light control sheet 11 of Comparative Example 3 was obtained under the same condition as that in Example 1, except that the dichroic dye DP, the first protective layer 38, and the second protective layer 39 of Example 1 were changed. That is, only 2% by weight of a blue-color dichroic dye (product name M-412: manufactured by Mitsui Fine Chemicals, Inc.) was used as the dichroic dye DP to prepare a coating liquid of Comparative Example 3 at the same formulation ratio as that of the coating liquid of Example 1. Then, the light control sheet 11 of Comparative Example 3 was obtained under the same condition as that in Example 1, except for the first protective layer 38 and the second protective layer 39.

The optical characteristics of the laminate 13 of Comparative Example 3 are illustrated below.

Total light transmittance: 11.5%
Chromaticity $a^*$: +17.7
Chromaticity $b^*$: −48.7

The optical characteristics of the first protective layer 38 and the second protective layer 39 of Comparative Example 3 are illustrated below. In the absorption wavelength range of the first protective layer 38 and the second protective layer 39 of Comparative Example 3, the smallest value is 360 nm, and the largest value of the absorption wavelength range is 430 nm.

Absorption wavelength: 360 nm or more and 430 nm or less
Chromaticity $a^*$: −7.8
Chromaticity $b^*$: +13.0

Evaluation

For the light control sheet 11 of each of Examples 1 to 3 and Comparative Examples 1 to 3, evaluation was performed on evaluation items (a) to (d) below.

(a) Total light transmittance in opaque state of light control sheet 11
(b) Chromaticity evaluation
(C) Color evaluation
(D) Light resistance evaluation In the measurement of the total light transmittance of the above-described (a), the total light transmittance was measured using a total light transmittance measuring device (product name: NDH7000, manufactured by Nippon Denshoku Industries Co., Ltd.) by a method in accordance with JIS K 7361-1:1997 (ISO 1468-1), while maintaining an opaque state in a state of not applying a drive voltage to the light control sheet 11.

The total light transmittance of Example 1 was 15.0% which was the largest, and the total light transmittance of each of Examples 1 to 3 and Comparative Examples 1 to 3 was 30% or less. Therefore, Examples 1 to 3 and Comparative Examples 1 to 3 satisfied the above-described Characteristic 1.

In the evaluation of the chromaticity of the above-described (b), chromaticity $a^*$ and chromaticity $b^*$ were measured using a colorimeter (product name U-4100, manufactured by Hitachi High-Tech Science Corporation). The light control sheets 11 of Examples 1 to 3 and the light control sheets 11 of Comparative Examples 1 and 2 satisfied Characteristic 2. The laminate 13 of Comparative Example 3 had a chromaticity $a^*$ of 17.7 and a chromaticity $b^*$ of −48.7 and did not satisfy Characteristic 2.

In the evaluation of the color of the above-described (C), it was determined by the naked eye whether a yellow color was exhibited. In Examples 1 to 3 and Comparative Examples 1 and 2, a yellow color was not observed. In the table illustrated in FIG. 5, "Good" is assigned as the evaluation for such a level that a yellow color was not observed. Further, in Comparative Example 3 which does not satisfy Characteristic 2, a yellow color was observed. In the table shown in FIG. 5, the level such that a yellow color was observed is evaluated as "Poor".

Figure 6:
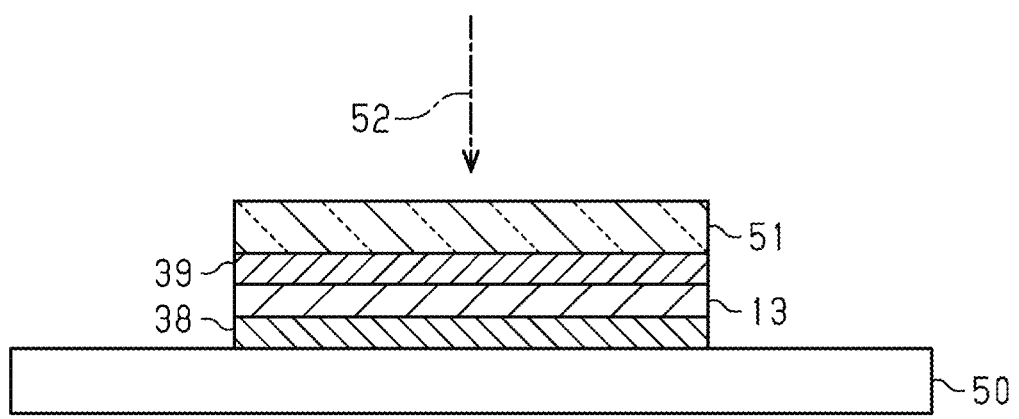
FIG. 6 is a diagram for explaining a method of evaluating light resistance of a light control sheet.

With reference to FIG. 6, an evaluation method of the light resistance of the above-described (d) will be described. The light control sheet 11 was placed on a stage 51, and chromaticity was measured using a colorimeter. The measured chromaticity was defined as the initial chromaticity. Furthermore, a glass plate 50 having a thickness of 1.1 mm was placed on the light control sheet 11, and irradiation with ultraviolet light 52 was performed using an ultraviolet light irradiation device (EYESUPER UV TESTER, manufactured by Iwasaki Electric Co., Ltd.). The irradiation conditions were a temperature of 60° C., an illuminance of 65 mW/cm$^2$, and 500 hours. After irradiation with ultraviolet light for 500 hours, chromaticity was measured and compared with the initial chromaticity. In the table shown in FIG. 5, a high light resistance where the difference in chromaticity is 3 or less is evaluated as "Good". In the table illustrated in FIG. 5, "Fair" is assigned as an evaluation indicating low light resistance for such a level that a difference in chromaticity is more than 3 and 5 or less. In the table illustrated in FIG. 5, "Poor" is assigned as an evaluation indicating low light resistance for such a level that a difference in chromaticity is more than 5.

In Examples 1 to 3 and Comparative Examples 3, there was no significant change between the initial chromaticity and the chromaticity after irradiation with ultraviolet light, and it was found that the light resistance is high. On the other hand, in Comparative Example 1, the light resistance was low, and the evaluation was "Poor". It is assumed that this is because the absorption wavelength range of the first protective layer 38 and the second protective layer 39 is 360 nm or more and 395 nm, and the largest wavelength does not reach the visible range. In Comparative Example 2, it was found that although the degree of the discoloration of Comparative Example 1 was not reached, the light resistance was low, and the evaluation was "Fair". It is assumed that this is because although the absorption wavelength range of the first protective layer 38 and the second protective layer 39 is 360 nm or more and 407 nm, and the largest wavelength reaches the visible range, the largest value of the absorption wavelength range is not a long wavelength to a degree that sufficiently suppresses the light resistance of the dichroic dye DP.

Variations

The above-described embodiments may be modified and implemented as follows. The above-described embodiments and the following modifications can be combined with each other and implemented within a range that is technically not inconsistent.

In the above-described embodiments, the spacer SP exhibits the same color as a black color exhibited by the light control layer in an opaque state. Instead of or in addition to this, the spacer SP may exhibit a similar color to a black color exhibited by the light control layer 31 in an opaque state. Alternatively, some or all of the spacers SP added to the light control layer 31 may be colorless transparent and have a such a small particle diameter as to have an inconspicuous appearance.

In the above-described embodiments, the light control sheet 11 includes the first protective layer 38 on one surface of the laminate 13 and also includes the second protective layer 39 on the other surface of the laminate 13. Instead of this, the light control sheet 11 may include one protective layer on only one surface of the laminate 13.

In the above-described embodiments, the first protective layer 38 and the second protective layer 39 absorb light having a specific wavelength range including the ultraviolet region, which suppresses the entering of light having a specific wavelength into the light control layer 31. Instead of or in addition to this, the first protective layer 38 and the second protective layer 39 may reflect light having a specific wavelength range and thus suppress the entering of light having a specific wavelength into the light control layer 31.

In the above-described embodiments, the light control layer 31 has a resin layer and a liquid crystal composition. Instead of this, the light control sheet 11 may use a suspended particle device (SPD) technique with light-adjusting particles as orientation particles. The SPD technique is a technique of dispersing, in a resin matrix, a light-adjusting suspension that contains light-adjusting particles.

A light control sheet includes a first transparent electrode layer, a second transparent electrode layer, and a light control layer sandwiched between the first transparent electrode layer and the second transparent electrode layer. A change in an orientation state of a liquid crystal compound contained in the light control layer changes the light transmittance of the light control sheet, following a change in a potential difference between the two transparent electrode layers. For example, when the ordered orientation of the liquid crystal compound is established, the light control sheet exhibits high light transmittance. When the major axis direction of the liquid crystal compound is disordered, the light control sheet exhibits low light transmittance.

In general, a light control sheet is colorless and transparent in a transparent state exhibiting high light transmittance. A light control sheet scatters visible light inside the light control sheet in an opaque state, exhibiting low light transmittance, thereby having a turbid appearance. The use environment of a light control sheet imparts higher designability to a colored light control sheet than to a clouded light control sheet. Therefore, adding a dichroic dye to a liquid crystal composition has been proposed (for example, see JP 2020-016710 A). A dichroic dye has anisotropy in absorbance and exhibits high absorbance when its major axis direction is disordered. A light control sheet in an opaque state is not in a clouded state but expresses a color derived from the dichroic dye and becomes in a state exhibiting low light transmittance.

In a dichroic dye, a decomposition reaction proceeds with exposure to ultraviolet light. Therefore, when a light control sheet is used for a long period, color fading derived from the decomposition of the dichroic dye occurs. The liquid crystal element described in the above-described literature contains, in the liquid crystal composition, an ultraviolet absorbent capable of absorbing ultraviolet light at 290 nm to 400 nm.

However, in some cases the dichroic dye also fades in color due to visible light. Therefore, further enhancing the light resistance of the light control sheet is desirable.

A light control sheet according to an embodiment of the present invention includes: a laminate having a light control layer that contains a liquid crystal compound and a dichroic dye; a pair of transparent electrode layers between which the light control layer is sandwiched; and a pair of transparent support layers between which the light control layer and the pair of the transparent electrode layers are sandwiched, changing orientations of the liquid crystal compound and the dichroic dye in response to a change in a potential difference between the pair of the transparent electrode layers so that a transparent state is reversibly changed to a colored opaque state, and further including a protective layer that is disposed to at least one of the transparent support layers on a surface opposite to a surface in contact with the transparent electrode layer and absorbs light in an absorption wavelength range including the ultraviolet region.

The laminate in the opaque state has a chromaticity a* of −15 or more and 15 or less and a chromaticity b* of −16 or more and 15 or less in the CIE1976 (L*a*b*) color system in accordance with JIS-Z-8781-4, the smallest value of the absorption wavelength range of the protective layer is 360 nm or less, the largest value of the absorption wavelength range of the protective layer is 410 nm or more and 430 nm or less within the visible region, and the protective layer has a chromaticity a* of −10 or more and 0 or less and a chromaticity b* of 0 or more and 15 or less in the CIE1976 (L*a*b*) color system in accordance with JIS-Z-8781-4.

A light control device according to another embodiment of the present invention includes: a laminate having a light control layer that contains a liquid crystal compound and a dichroic dye, a pair of transparent electrode layers between which the light control layer is sandwiched, and a pair of transparent support layers between which the light control layer and the pair of the transparent electrode layers are sandwiched; and a drive unit that causes occurrence of a potential difference between the pair of the transparent electrode layers to control orientations of the liquid crystal compound and the dichroic dye and controls the laminate to a transparent state and an opaque state, and further including a protective layer that is disposed to at least one of the transparent support layers on a surface opposite to a surface in contact with the transparent electrode layer and absorbs light in an absorption wavelength range including the ultraviolet region. The laminate in the opaque state has a chromaticity a* of −15 or more and 15 or less and a chromaticity b* of −16 or more and 15 or less in the CIE1976 (L*a*b*) color system in accordance with JIS-Z-8781-4, the smallest value of the absorption wavelength range of the protective layer is 360 nm or less, the largest value of the absorption wavelength range of the protective layer is 410 nm or more and 430 nm or less within the visible region, and the protective layer has a chromaticity a* of −10 or more and 0 or less and a chromaticity b* of 0 or more and 15 or less in the CIE1976 (L*a*b*) color system in accordance with JIS-Z-8781-4.

In a laminate having a light control layer 31 that contains a dichroic dye, chromaticity a* in the CIE1976 (L*a*b*) color system is −15 or more and 15 or less, chromaticity b* is −16 or more and 15 or less, and the laminate exhibits a black color or a color close to a black color. Further, since the light control sheet includes a first protective layer and a second protective layer which absorb light in an absorption wavelength range including the ultraviolet region, color fading of the dichroic dye, which has lower light resistance than the liquid crystal compound or the like, is suppressed. Since the largest value of the absorption wavelength range of the first protective layer and the second protective layer is 410 nm or more and 430 nm or less, the effect of suppressing the color fading of the dichroic dye can be enhanced, while the first protective layer and the second protective layer take on a yellow color. On the other hand, since the first protective layer and the second protective layer have a chromaticity a* of −10 or more and 0 or less and a chromaticity b* of 0 or more and 15 or less in the CIE1976 (L*a*b*) color system, the first protective layer and the second protective layer exhibit a black color or a color close to a black color, and the above-described yellow color is cancelled. Further, since the laminate exhibiting a black color is laminated with the first protective layer and the second protective layer which similarly exhibit a black color or a color close to a black color, the color tone of the laminate does not change drastically.

In the light control sheet, the protective layer may have a total light transmittance of 70% or more.

According to the above-described configuration, the light control sheet enhances transparency in a transparent state while expressing a black color or a color close to a black color in an opaque state.

In the above-described light control sheet, the total light transmittance in an opaque state may be 30% or less.

According to the above-described configuration, privacy of a space sectioned by the light control sheet in an opaque state is protected.

The above-described light control sheet may further include a spacer that exhibits the same color as a color exhibited by the dichroic dye in the opaque state.

Since the spacer exhibits the same color as a color exhibited by the laminate in an opaque state, the spacer has an inconspicuous appearance.

In the above-described light control sheet, the light control layer may include an organic polymer layer that divides multiple voids in the light control layer and a liquid crystal composition retained in the voids, the content ratio of the organic polymer layer to the total amount of the organic polymer layer and the liquid crystal composition may be 30% by mass or more and 70% by mass or less, each of the transparent support layers may include the protective layer, the content ratio of the dichroic dye to the weight of the organic polymer layer may be 10% by weight or less, and the dichroic dye may be a black-color dichroic dye.

In the above-described light control sheet, the light control layer may include an organic polymer layer that sections voids in the light control layer and a liquid crystal composition retained in the voids, the content ratio of the organic polymer layer to the total amount of the organic polymer layer and the liquid crystal composition may be 30% by mass or more and 70% by mass or less, each of the transparent support layers may include the protective layer, the content ratio of the dichroic dye to the weight of the organic polymer layer may be 10% by weight or less, the dichroic dye may be a mixture of a black-color dichroic dye and a blue-color dichroic dye, the chromaticity b* of the laminate in the opaque state may be less than 0, and the chromaticity b* of the protective layer may be more than 0.

According to an embodiment of the present invention, the light resistance of the light control sheet that contains the dichroic dye is improved.

Obviously, numerous modifications and variations of the present invention are possible in light of the above teachings. It is therefore to be understood that within the scope of the appended claims, the invention may be practiced otherwise than as specifically described herein.

The invention claimed is:

1. A light control sheet, comprising:
   a laminate comprising a light control layer, a pair of transparent electrode layers sandwiching the light control layer, and a pair of transparent support layers sandwiching the transparent electrode layers; and
   a protective layer positioned on a surface of one of the transparent support layers of the laminate such that the protective layer absorbs light in an absorption wavelength range including an ultraviolet region,
   wherein the light control layer in the laminate includes a liquid crystal compound and a dichroic dye such that orientations of the liquid crystal compound and the dichroic dye change in response to a change in a potential difference between the transparent electrode layers and that a transparent state is reversibly changed to an opaque state, the laminate in the opaque state has a chromaticity a* in a range of −15 to 15 and a chromaticity b* in a range of −16 to 15 in a CIE1976 (L*a*b*) color system in accordance with JIS-Z-8781-4, the absorption wavelength range of the protective layer has a smallest value of 360 nm or less, a largest value in a range of 410 nm to 430 nm within a visible region, and the protective layer has a chromaticity a* in a range of −10 to 0 and a chromaticity b* in a range of 0 to 15 in a CIE1976 (L*a*b*) color system in accordance with JIS-Z-8781-4.

2. The light control sheet according to claim 1, wherein the protective layer has a total light transmittance of 70% or more.

3. The light control sheet according to claim 2, further comprising:
a spacer that exhibits a color exhibited by the dichroic dye in the opaque state.

4. The light control sheet according to claim 3, wherein the light control sheet in the opaque state has a total light transmittance of 30% or less.

5. The light control sheet according to claim 4, further comprising:
a second protective layer positioned on a surface of the other one of the transparent support layers of the laminate such that the second protective layer absorbs light in an absorption wavelength range including an ultraviolet region,
wherein the absorption wavelength range of the second protective layer has a smallest value of 360 nm or less, a largest value in a range of 410 nm to 430 nm within a visible region, the second protective layer has a chromaticity a* in a range of −10 to 0 and a chromaticity b* in a range of 0 to 15 in a CIE1976 (L*a*b*) color system in accordance with JIS-Z-8781-4, and the light control layer includes an organic polymer layer forming a plurality of voids in the light control layer and a liquid crystal composition retained in the voids such that a content ratio of the organic polymer layer to a total amount of the organic polymer layer and the liquid crystal composition is in a range of 30% by mass to 70% by mass, a content ratio of the dichroic dye to the weight of the organic polymer layer is 10% by weight or less, and the dichroic dye is a black-color dichroic dye.

6. The light control sheet according to claim 4, further comprising:
a second protective layer positioned on a surface of the other one of the transparent support layers of the laminate such that the second protective layer absorbs light in an absorption wavelength range including an ultraviolet region,
wherein the absorption wavelength range of the second protective layer has a smallest value of 360 nm or less, a largest value in a range of 410 nm to 430 nm within a visible region, the second protective layer has a chromaticity a* in a range of −10 to 0 and a chromaticity b* in a range of 0 to 15 in a CIE1976 (L*a*b*) color system in accordance with JIS-Z-8781-4, and the light control layer includes an organic polymer layer forming a plurality of voids in the light control layer and a liquid crystal composition retained in the voids such that a content ratio of the organic polymer layer to a total amount of the organic polymer layer and the liquid crystal composition is in a range of 30% by mass to 70% by mass, a content ratio of the dichroic dye to a weight of the organic polymer layer is 10% by weight or less, the dichroic dye is a mixture of a black-color dichroic dye and a blue-color dichroic dye, the chromaticity b* of the laminate in the opaque state is less than 0, and the chromaticity b* of the protective layer is more than 0.

7. The light control sheet according to claim 3, further comprising:
a second protective layer positioned on a surface of the other one of the transparent support layers of the laminate such that the second protective layer absorbs light in an absorption wavelength range including an ultraviolet region,
wherein the absorption wavelength range of the second protective layer has a smallest value of 360 nm or less, a largest value in a range of 410 nm to 430 nm within a visible region, the second protective layer has a chromaticity a* in a range of −10 to 0 and a chromaticity b* in a range of 0 to 15 in a CIE1976 (L*a*b*) color system in accordance with JIS-Z-8781-4, and the light control layer includes an organic polymer layer forming a plurality of voids in the light control layer and a liquid crystal composition retained in the voids such that a content ratio of the organic polymer layer to a total amount of the organic polymer layer and the liquid crystal composition is in a range of 30% by mass to 70% by mass, a content ratio of the dichroic dye to the weight of the organic polymer layer is 10% by weight or less, and the dichroic dye is a black-color dichroic dye.

8. The light control sheet according to claim 3, further comprising:
a second protective layer positioned on a surface of the other one of the transparent support layers of the laminate such that the second protective layer absorbs light in an absorption wavelength range including an ultraviolet region,
wherein the absorption wavelength range of the second protective layer has a smallest value of 360 nm or less, a largest value in a range of 410 nm to 430 nm within a visible region, the second protective layer has a chromaticity a* in a range of −10 to 0 and a chromaticity b* in a range of 0 to 15 in a CIE1976 (L*a*b*) color system in accordance with JIS-Z-8781-4, and the light control layer includes an organic polymer layer forming a plurality of voids in the light control layer and a liquid crystal composition retained in the voids such that a content ratio of the organic polymer layer to a total amount of the organic polymer layer and the liquid crystal composition is in a range of 30% by mass to 70% by mass, a content ratio of the dichroic dye to a weight of the organic polymer layer is 10% by weight or less, the dichroic dye is a mixture of a black-color dichroic dye and a blue-color dichroic dye, the chromaticity b* of the laminate in the opaque state is less than 0, and the chromaticity b* of the protective layer is more than 0.

9. The light control sheet according to claim 2, wherein the light control sheet in the opaque state has a total light transmittance of 30% or less.

10. The light control sheet according to claim 2, further comprising:
a second protective layer positioned on a surface of the other one of the transparent support layers of the laminate such that the second protective layer absorbs light in an absorption wavelength range including an ultraviolet region,
wherein the absorption wavelength range of the second protective layer has a smallest value of 360 nm or less, a largest value in a range of 410 nm to 430 nm within a visible region, the second protective layer has a chromaticity a* in a range of −10 to 0 and a chromaticity b* in a range of 0 to 15 in a CIE1976 (L*a*b*) color system in accordance with JIS-Z-8781-4, and the light control layer includes an organic polymer layer forming a plurality of voids in the light control layer and a liquid crystal composition retained in the voids such that a content ratio of the organic polymer layer to a total amount of the organic polymer layer and the liquid crystal composition is in a range of 30% by mass to 70% by mass, a content ratio of the dichroic dye to the weight of the organic polymer layer is 10% by weight or less, and the dichroic dye is a black-color dichroic dye.

11. The light control sheet according to claim 2, further comprising:
a second protective layer positioned on a surface of the other one of the transparent support layers of the laminate such that the second protective layer absorbs light in an absorption wavelength range including an ultraviolet region,
wherein the absorption wavelength range of the second protective layer has a smallest value of 360 nm or less, a largest value in a range of 410 nm to 430 nm within a visible region, the second protective layer has a chromaticity a* in a range of −10 to 0 and a chromaticity b* in a range of 0 to 15 in a CIE1976 (L*a*b*) color system in accordance with JIS-Z-8781-4, and the light control layer includes an organic polymer layer forming a plurality of voids in the light control layer and a liquid crystal composition retained in the voids such that a content ratio of the organic polymer layer to a total amount of the organic polymer layer and the liquid crystal composition is in a range of 30% by mass to 70% by mass, a content ratio of the dichroic dye to a weight of the organic polymer layer is 10% by weight or less, the dichroic dye is a mixture of a black-color dichroic dye and a blue-color dichroic dye, the chromaticity b* of the laminate in the opaque state is less than 0, and the chromaticity b* of the protective layer is more than 0.

12. The light control sheet according to claim 1, further comprising:
a spacer that exhibits a color exhibited by the dichroic dye in the opaque state.

13. The light control sheet according to claim 12, wherein the light control sheet in the opaque state has a total light transmittance of 30% or less.

14. The light control sheet according to claim 12, further comprising:
a second protective layer positioned on a surface of the other one of the transparent support layers of the laminate such that the second protective layer absorbs light in an absorption wavelength range including an ultraviolet region,
wherein the absorption wavelength range of the second protective layer has a smallest value of 360 nm or less, a largest value in a range of 410 nm to 430 nm within a visible region, the second protective layer has a chromaticity a* in a range of −10 to 0 and a chromaticity b* in a range of 0 to 15 in a CIE1976 (L*a*b*) color system in accordance with JIS-Z-8781-4, and the light control layer includes an organic polymer layer forming a plurality of voids in the light control layer and a liquid crystal composition retained in the voids such that a content ratio of the organic polymer layer to a total amount of the organic polymer layer and the liquid crystal composition is in a range of 30% by mass to 70% by mass, a content ratio of the dichroic dye to the weight of the organic polymer layer is 10% by weight or less, and the dichroic dye is a black-color dichroic dye.

15. The light control sheet according to claim 12, further comprising:
a second protective layer positioned on a surface of the other one of the transparent support layers of the laminate such that the second protective layer absorbs light in an absorption wavelength range including an ultraviolet region,
wherein the absorption wavelength range of the second protective layer has a smallest value of 360 nm or less, a largest value in a range of 410 nm to 430 nm within a visible region, the second protective layer has a chromaticity a* in a range of −10 to 0 and a chromaticity b* in a range of 0 to 15 in a CIE1976 (L*a*b*) color system in accordance with JIS-Z-8781-4, and the light control layer includes an organic polymer layer forming a plurality of voids in the light control layer and a liquid crystal composition retained in the voids such that a content ratio of the organic polymer layer to a total amount of the organic polymer layer and the liquid crystal composition is in a range of 30% by mass to 70% by mass, a content ratio of the dichroic dye to a weight of the organic polymer layer is 10% by weight or less, the dichroic dye is a mixture of a black-color dichroic dye and a blue-color dichroic dye, the chromaticity b* of the laminate in the opaque state is less than 0, and the chromaticity b* of the protective layer is more than 0.

16. The light control sheet according to claim 1, wherein the light control sheet in the opaque state has a total light transmittance of 30% or less.

17. The light control sheet according to claim 1, further comprising:
a second protective layer positioned on a surface of the other one of the transparent support layers of the laminate such that the second protective layer absorbs light in an absorption wavelength range including an ultraviolet region,
wherein the absorption wavelength range of the second protective layer has a smallest value of 360 nm or less, a largest value in a range of 410 nm to 430 nm within a visible region, the second protective layer has a chromaticity a* in a range of −10 to 0 and a chromaticity b* in a range of 0 to 15 in a CIE1976 (L*a*b*) color system in accordance with JIS-Z-8781-4, and the light control layer includes an organic polymer layer forming a plurality of voids in the light control layer and a liquid crystal composition retained in the voids such that a content ratio of the organic polymer layer to a total amount of the organic polymer layer and the liquid crystal composition is in a range of 30% by mass to 70% by mass, a content ratio of the dichroic dye to the weight of the organic polymer layer is 10% by weight or less, and the dichroic dye is a black-color dichroic dye.

18. The light control sheet according to claim 1, further comprising:
a second protective layer positioned on a surface of the other one of the transparent support layers of the laminate such that the second protective layer absorbs light in an absorption wavelength range including an ultraviolet region, wherein the absorption wavelength range of the second protective layer has a smallest value of 360 nm or less, a largest value in a range of 410 nm to 430 nm within a visible region, the second protective layer has a chromaticity a* in a range of −10 to 0 and a chromaticity b* in a range of 0 to 15 in a CIE1976 (L*a*b*) color system in accordance with JIS-Z-8781-4, and the light control layer includes an organic polymer layer forming a plurality of voids in the light control layer and a liquid crystal composition retained in the voids such that a content ratio of the organic polymer layer to a total amount of the organic polymer layer and the liquid crystal composition is in a range of 30% by mass to 70% by mass, a content ratio of the dichroic dye to a weight of the organic polymer layer is 10% by weight or less, the dichroic dye is a mixture of a black-color dichroic dye and a blue-color dichroic dye, the chromaticity b* of the laminate in the opaque state is less than 0, and the chromaticity b* of the protective layer is more than 0.

19. A light control device, comprising:

a laminate comprising a light control layer, a pair of transparent electrode layers sandwiching the light control layer, and a pair of transparent support layers sandwiching the transparent electrode layers;

a drive unit comprising circuitry configured to cause a potential difference between the pair of the transparent electrode layers and control the laminate between a transparent state and an opaque state; and a protective layer positioned on a surface of one of the transparent support layers of the laminate such that the protective layer absorbs light in an absorption wavelength range including an ultraviolet region, wherein the light control layer in the laminate includes a liquid crystal compound and a dichroic dye such that orientations of the liquid crystal compound and the dichroic dye change in response to a change in the potential difference between the transparent electrode layers, the laminate in the opaque state has a chromaticity a* in a range of −15 to 15 and a chromaticity b* in a range of −16 to 15 in a CIE1976 (L*a*b*) color system in accordance with JIS-Z-8781-4, the absorption wavelength range of the protective layer has a smallest value of 360 nm or less, a largest value in a range of 410 nm to 430 nm within a visible region, and the protective layer has a chromaticity a* in a range of −10 to 0 and a chromaticity b* in a range of 0 to 15 in a CIE1976 (L*a*b*) color system in accordance with JIS-Z-8781-4.

* * * * *